US009562619B2

(12) United States Patent
Kojima et al.

(10) Patent No.: US 9,562,619 B2
(45) Date of Patent: Feb. 7, 2017

(54) SAFETY VALVE

(71) Applicant: TOYOTA JIDOSHA KABUSHIKI KAISHA, Toyota-shi, Aichi-ken (JP)

(72) Inventors: Makoto Kojima, Toyota (JP); Sogo Goto, Miyoshi (JP); Takao Fukunaga, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/633,222

(22) Filed: Feb. 27, 2015

(65) Prior Publication Data
US 2015/0252911 A1    Sep. 10, 2015

(30) Foreign Application Priority Data

Mar. 5, 2014    (JP) ................................ 2014-043169

(51) Int. Cl.
*F16K 17/14*    (2006.01)
*F16K 17/38*    (2006.01)
(Continued)

(52) U.S. Cl.
CPC ............ *F16K 17/383* (2013.01); *F17C 13/04* (2013.01); *F17C 13/12* (2013.01); *F17C 2201/0109* (2013.01); *F17C 2201/056* (2013.01); *F17C 2201/058* (2013.01); *F17C 2203/0617* (2013.01); *F17C 2205/0305* (2013.01);
(Continued)

(58) Field of Classification Search
CPC ............ F16K 17/383; Y10T 137/1797; Y10T 137/1632; Y10T 137/1639; Y10T 137/1812; Y10T 137/1963; F17C 13/04; F17C 2201/0109; F17C 2201/056; F17C 2201/058; F17C 2203/0617; F17C 2205/0305; F17C 2205/0317; F17C 2205/0332; F17C 2205/0397; F17C 2221/012; F17C 2223/0123; F17C 2223/036; F17C 2270/0184
(Continued)

(56) References Cited

U.S. PATENT DOCUMENTS 1,303,248 A * 5/1919 Breidenbach ......... F16K 17/383
                                                  137/68.23
1,388,383 A * 8/1921 Smith ..................... F24H 9/126
                                                  122/14.1
(Continued)

FOREIGN PATENT DOCUMENTS

DE    10 2010 011 879 A1    9/2011
JP         08-233139 A       9/1996
(Continued)

*Primary Examiner* — Mary McManmon
*Assistant Examiner* — Minh Le
(74) *Attorney, Agent, or Firm* — Finnegan, Henderson, Farabow, Garrett & Dunner, LLP

(57) ABSTRACT

A safety valve includes: a valve element; a valve seat that has a gas release hole from which a gas is released and a protrusion that protrudes towards the valve element; and a meltable body that is made of a material capable of being melt at an abnormal high temperature. At a temperature other than the abnormal high temperature, the meltable body limits displacement of the valve element to thereby prevent inflow of the gas towards the gas release hole. At the abnormal high temperature, the meltable body is melt, thereby the valve element is displaced and the gas is released from the gas release hole.

7 Claims, 8 Drawing Sheets

(51) Int. Cl.
*F17C 13/04* (2006.01)
*F17C 13/12* (2006.01)
*H01M 8/04* (2016.01)

(52) U.S. Cl.
CPC .......... *F17C 2205/0317* (2013.01); *F17C 2205/0332* (2013.01); *F17C 2205/0382* (2013.01); *F17C 2205/0397* (2013.01); *F17C 2221/012* (2013.01); *F17C 2223/0123* (2013.01); *F17C 2223/036* (2013.01); *F17C 2270/0184* (2013.01); *H01M 8/04201* (2013.01); *Y10T 137/1797* (2015.04)

(58) Field of Classification Search
USPC ......... 137/72, 74, 68.11, 68.12, 79; 251/288
See application file for complete search history.

(56) References Cited

U.S. PATENT DOCUMENTS

| | | | | |
|---|---|---|---|---|
| 2,920,638 A * | 1/1960 | Heckethorn | .......... | F16K 17/162 137/68.12 |
| 4,059,125 A * | 11/1977 | Sugimura | .......... | F16K 17/383 137/493.2 |
| 4,744,383 A * | 5/1988 | Visnic | .......... | F16K 17/383 137/72 |
| 5,511,576 A | 4/1996 | Borland | | |
| 5,632,297 A * | 5/1997 | Sciullo | .......... | F16K 17/383 137/72 |
| 6,367,499 B1 * | 4/2002 | Taku | .......... | F17C 13/04 137/72 |
| 6,866,057 B1 * | 3/2005 | Buehrle, II | .......... | F16K 17/383 137/74 |
| 7,140,591 B2 * | 11/2006 | Droppleman | .......... | F16K 1/305 222/189.06 |
| 8,141,574 B2 * | 3/2012 | Weatherly | .......... | F16K 17/383 137/72 |
| 8,550,105 B2 * | 10/2013 | Ishitoya | .......... | F16K 1/307 137/72 |
| 8,733,382 B2 * | 5/2014 | Suess | .......... | F16K 17/383 137/468 |
| 8,800,587 B2 * | 8/2014 | Breuer | .......... | F16K 17/38 137/72 |
| 2008/0041455 A1 * | 2/2008 | Hsiao | .......... | F16K 1/307 137/73 |
| 2009/0038687 A1 * | 2/2009 | Kremer | .......... | F16K 17/383 137/74 |
| 2010/0282330 A1 * | 11/2010 | Luther | .......... | A43B 1/0027 137/68.11 |
| 2012/0012190 A1 * | 1/2012 | Barber | .......... | F16K 31/001 137/68.11 |
| 2012/0080625 A1 | 4/2012 | Imoto et al. | | |
| 2012/0132298 A1 | 5/2012 | Ishitoya et al. | | |
| 2013/0087214 A1 | 4/2013 | Dorr | | |

FOREIGN PATENT DOCUMENTS

| | | |
|---|---|---|
| JP | 2005-315294 | 11/2005 |
| JP | 2011-94712 | 5/2011 |
| JP | 2012-77885 | 4/2012 |
| JP | 2012-132475 | 7/2012 |
| JP | 2013-160355 | 8/2013 |
| WO | WO 2009/010177 A1 | 1/2009 |

* cited by examiner

SAFETY VALVE

INCORPORATION BY REFERENCE

The disclosure of Japanese Patent Application No. 2014-043169 filed on Mar. 5, 2014, including the specification, drawings and abstract, is incorporated herein by reference in its entirety.

BACKGROUND OF THE INVENTION

Field of the Invention

The invention relates to a technique of a safety valve and, in particular, to a safety valve that has a meltable body capable of being melt at a predetermined abnormal high temperature.

Description of Related Art

A meltable type safety valve is known as a safety device for preventing a pressure inside a pressure container from excessively rising when a temperature inside the container becomes an abnormal high temperature. The meltable type safety valve has a meltable body capable of being melt at an abnormal high temperature. At a normal temperature, displacement of a valve element is limited by means of the meltable body. At an abnormal high temperature, the meltable body is melt to release the limit of the valve element and displace the valve element, so that a flow path leading to the outside is opened and the pressure inside the container is reduced. A meltable type safety valve that has a meltable plug for use in the safety valve disclosed in Japanese Patent Application Publication No. 2012-132475 (JP 2012-132475 A), for example, exists as a meltable type safety valve having such a structure.

The meltable type safety valve disclosed in JP 2012-132475 A has a substantially cylindrical meltable body. In the meltable type safety valve, the fusibility of the meltable body is maintained and the strength of the meltable body is increased by means of a structure in which the strength of a part around an axis (a central part) of the meltable body is reduced and the strength of the circumference of the central part is increased. Moreover, in the meltable type safety valve in JP 2012-132475 A, damages of the meltable body in usual use (except in the case of an abnormal high temperature) are inhibited and wrong actions of the meltable type safety valve are prevented by increasing the strength of the meltable body.

In the meltable type safety valve disclosed in JP 2012-132475 A, a pressure inside the pressure container acts on the meltable body via the valve element, and damages of the meltable body caused by a creeping phenomenon are still worried about. In such a structure, in order to form a meltable type safety valve that can deal with a further high temperature and high pressure, the strength of the meltable body is required to be further increased. However, the strength of the meltable body itself is usually low, thereby it is hard to deal with the further high temperature and high pressure in the meltable type safety valve.

SUMMARY OF THE INVENTION

The invention provides a safety valve that achieves prevention of wrong actions at a high temperature and a high pressure.

A first aspect of the invention relates to a safety valve, including: a valve seat that has a gas release hole from which a gas is released; a valve element that allows inflow of the gas towards the gas release hole; and a meltable body that is made of a material capable of being melt at an abnormal high temperature. At a temperature other than the abnormal high temperature, the meltable body limits displacement of the valve element to thereby prevent the inflow of the gas towards the gas release hole. At the abnormal high temperature, the meltable body is melt, thereby the valve element is displaced and the gas is released from the gas release hole. The valve seat has a protrusion that protrudes towards the valve element.

According to the above structure, the pressure acting on the meltable body is inhibited to thereby prevent wrong actions at a high temperature and a high pressure.

It is permitted that the meltable body is arranged at a position where the gas release hole is blocked around the protrusion between the valve seat and the valve element.

In this case, a simple structure can be formed, and the pressure acting on the meltable body can be inhibited.

It is permitted that a gap portion is formed between the valve seat and the valve element when the meltable body is melt, and the valve element is inclined towards the gap portion by taking the protrusion as a fulcrum, so that the gas is released from the gas release hole.

In this case, simplification of the structure is achieved, and the valve element is inclined, so the gas release hole can be easily and reliably opened.

It is permitted that the valve seat has a release hole selection member that forms a gas flowing-through hole through which the gas flows at an end portion on a side facing the meltable body, and a direction in which the gas is released is changed by making the gas flowing-through hole communicate with the selected gas release hole.

In this case, a simple structure can be formed, and the direction in which the gas is released is easily adjusted.

A second aspect of the invention relates to a safety valve, including: a valve element; a valve seat that has a gas release hole from which a gas is released and a protrusion that protrudes towards the valve element; and a meltable body that is arranged between the valve element and the valve seat and contains a material capable of being melt at or above a predetermined temperature. The valve element and the meltable body are configured such that the meltable body limits displacement of the valve element to block the gas release hole before the meltable body is melt. The protrusion is configured such that the valve element is displaced by taking the protrusion as a fulcrum to open the gas release hole after the meltable body is melt.

BRIEF DESCRIPTION OF THE DRAWINGS

Features, advantages, and technical and industrial significances of exemplary embodiments of the invention will be described below with reference to the accompanying drawings, in which like numerals denote like elements, and wherein.

DETAILED DESCRIPTION OF EMBODIMENTS

Figure 1:
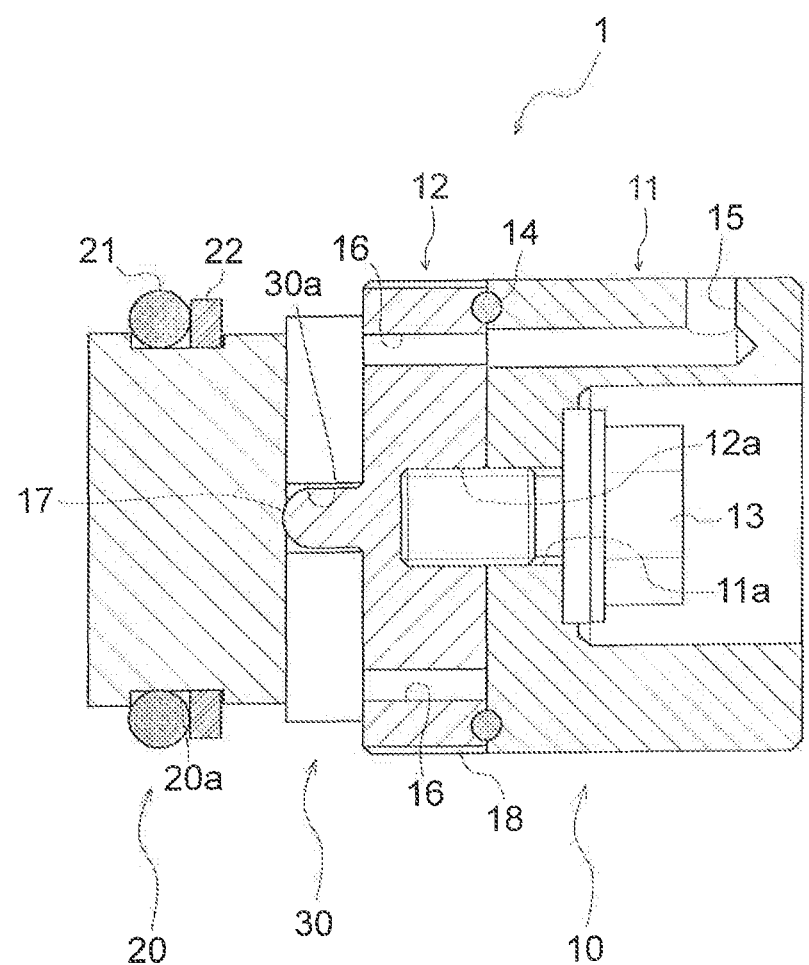
FIG. 1 is a sectional schematic view showing the overall structure of a meltable type safety valve of an embodiment of the invention.
Figure 2:
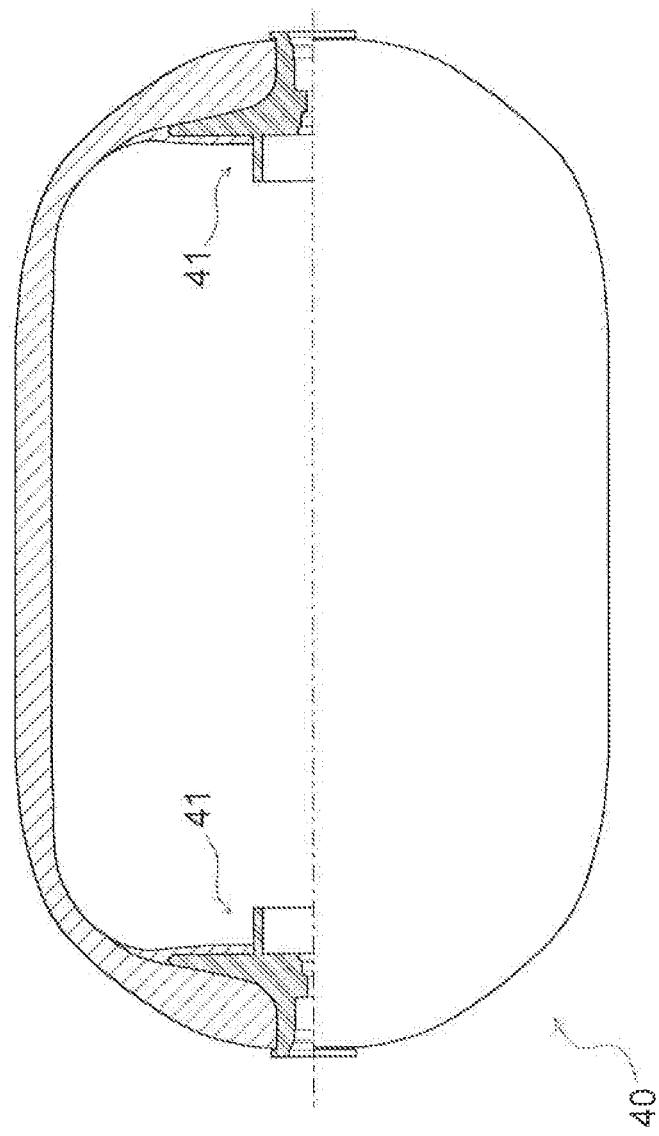
FIG. 2 is a schematic view showing a pressure container serving as an installation object of the meltable type safety valve.

Next, embodiments of the invention are described. Firstly, FIGS. 1-5 are used to illustrate the overall structure of a meltable type safety valve of an embodiment of the invention. As shown in FIG. 1, a meltable type safety valve 1 of an embodiment of the invention is used, for example, as a safety valve of a hydrogen tank of a fuel cell, and consists of a valve seat 10, a valve element 20 such as a valve core, a meltable body 30 and the like. The meltable type safety valve 1 is attached to a pressure container 40 as shown in FIG. 2 for use. In the case that the pressure container 40 is unexpectedly heated, in order to prevent the internal pressure from excessively rising, when a temperature of the pressure container 40 becomes an abnormal high temperature, the meltable type safety valve 1 is provided in order to make an inside of the pressure container 40 communicate with an outside of the pressure container 40 to release a gas inside the container.

Figure 3:
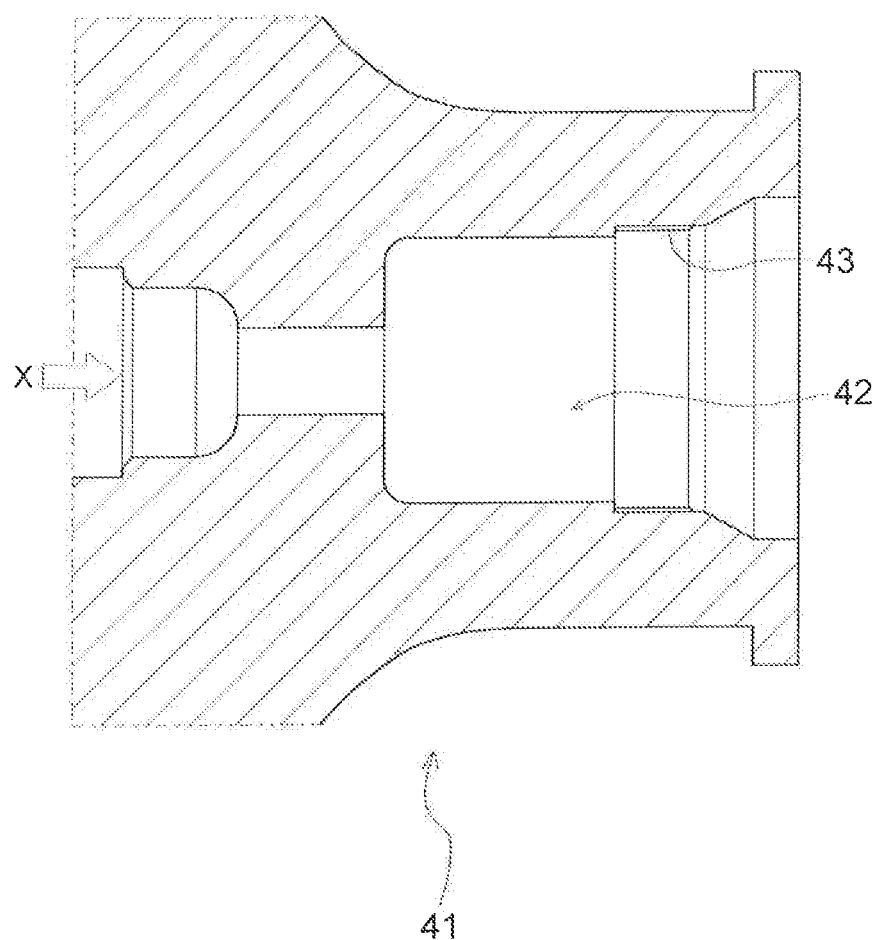
FIG. 3 is a partial schematic view showing a mouth ring of the pressure container.

The meltable type safety valve 1 is attached to a mouth ring 41 disposed in the pressure container 40 as shown in FIG. 3, and is configured to close an opening portion 42 of the mouth ring 41. For example, if the pressure container 40 is one as shown in FIG. 2, since there are two mouth rings 41, two meltable type safety valves 1 are used. In addition, it is also permitted to form a structure where one mouth ring 41 is closed using a plug or the like and the meltable type safety valve 1 is disposed only at one mouth ring 41.

A part of the mouth ring 41 is amplified in FIG. 3. The opening portion 42 that is a flow path of the gas is formed at the mouth ring 41, and an internal thread 43 for threaded connection to the meltable type safety valve 1 is formed on an inner circumferential surface of the opening portion 42. The direction in which the gas is released in the mouth ring 41 is the direction of the arrow X as shown in FIG. 3, and the gas is released from the inside to the outside of the pressure container 40.

As shown in FIG. 1, the valve seat 10 consists of a valve seat body 11, a release hole selection member 12, a bolt 13, an O-shaped seal ring 14 and the like. A bolt hole 11a is formed in the valve seat body 11, and an internal thread 12a is formed in the release hole selection member 12. In a state that an external threaded portion of the bolt 13 is inserted through the bolt hole 11a of the valve seat body 11, the external threaded portion of the bolt 13 is made to be in threaded connection with the internal thread 12a of the release hole selection member 12, so the valve seat body 11 and the release hole selection member 12 are fastened to be integrated, so that the valve seat 10 is constructed. Moreover, in the valve seat 10, an O-shaped seal ring 14 is sandwiched between the valve seat body 11 and the release hole selection member 12 to prevent the leakage of the gas from between the valve seat body 11 and the release hole selection member 12.

Moreover, a gas release hole 15 is formed in the valve seat body 11, and a gas flowing-through hole 16, which is used to cause the gas to flow towards the gas release hole 15, is formed in the release hole selection member 12. The gas release hole 15 at least communicates with one gas flowing-through hole 16, and a release path of the gas from the inside to the outside of the pressure container 40 is formed inside the valve seat 10.

The release hole selection member 12 constructs an end portion of the valve seat 10 on a side facing the meltable body 30, and a protrusion 17 is formed on a surface on a side opposite the side in contact with the valve seat body 11 (i.e., the end portion of the valve seat 10 on a side facing the meltable body 30). The protrusion 17 is formed such that it protrudes towards the valve element 20. At a temperature other than an abnormal temperature, it is preferred that a front end of the protrusion 17 abuts against the valve element 20. Thus, at a temperature other than an abnormal temperature, the valve element 20 can be supported by the protrusion 17. Moreover, an external thread 18 for making the valve seat 10 be in threaded connection with the mouth ring 41 is formed on a circumferential side surface of the release hole selection member 12. If the valve element 20 can be displaced, the protrusion 17 can be formed in an arbitrary position relative to the position of the valve element 20. For example, even if the protrusion 17 is designed to be arranged at the gravity center position of the valve element 20, it is also considered that a deviation from the gravity center position will be produced due to a manufacturing error, an operating environment or the like. In this case, the valve element 20 can be displaced. It is more preferred that the protrusion 17 is designed to be arranged at a position deviated from the gravity center of the valve element 20.

The valve element 20 is a substantially cylindrical member serving as a valve for closing or opening the opening portion 42, and has an outer diameter smaller than an inner diameter of the round opening portion 42. Moreover, a annular groove 20a for mounting an O-shaped seal ring 21 and a support ring 22 therein is formed on the circumferential side surface of the valve element 20. The support ring 22 is a member for limiting the displacement of the O-shaped seal ring 21 in the annular groove 20a. The outer diameter of the O-shaped seal ring 21 made of an elastomer is configured to be larger than the inner diameter of the opening portion 42, and a structure that ensures tightness (sealing property) between the circumference of the valve element 20 and the opening portion 42 is formed by pressing the valve element 20 and the O-shaped seal ring 21 into the opening portion 42.

A stress in a direction in which the valve element 20 is pressed from the opening portion 42 to the outside due to the gas filled in the pressure container 40 acts on the valve element 20, but such a stress can be resisted by means of the support by at least one of the meltable body 30 and the protrusion 17 (i.e., the valve seat 10).

The meltable body 30 is arranged between the valve seat 10 and the valve element 20 in the meltable type safety valve 1 such that it fills a gap existing between the valve seat 10 and the valve element 20. The meltable body 30 is a member made of a material capable of being melt at a temperature corresponding to the abnormal high temperature of the pressure container 40. The abnormal high temperature may be, for example, 600° C. by imaging a flame. A bismuth/indium system alloy, a gallium/indium system alloy or the like can be adopted as the material constructing the meltable body 30. The meltable body 30 has a though-hole 30a, the meltable body 30 is configured to surround the protrusion 17 and fill the gas existing between the valve seat 10 and the valve element 20 by inserting the protrusion 17 through the through-hole 30a, and the meltable body 30 blocks the gas flowing-through holes 16 formed in the release hole selection member 12. In this way, the meltable body 30 is configured to fill the gap existing between the valve seat 10 and the valve element 20, limit the displacement of the valve element 20, and block the gas flowing-through holes 16 formed in the release hole selection member 12 at the temperature other than an abnormal high temperature of the pressure container 40 (e.g., at a normal temperature). Moreover, the meltable body 30 is configured to be melt, release the limit of the valve element 20, and open the gas flowing-through holes 16 of the release hole selection member 12 at the abnormal high temperature of the pressure container 40.

Figure 4:
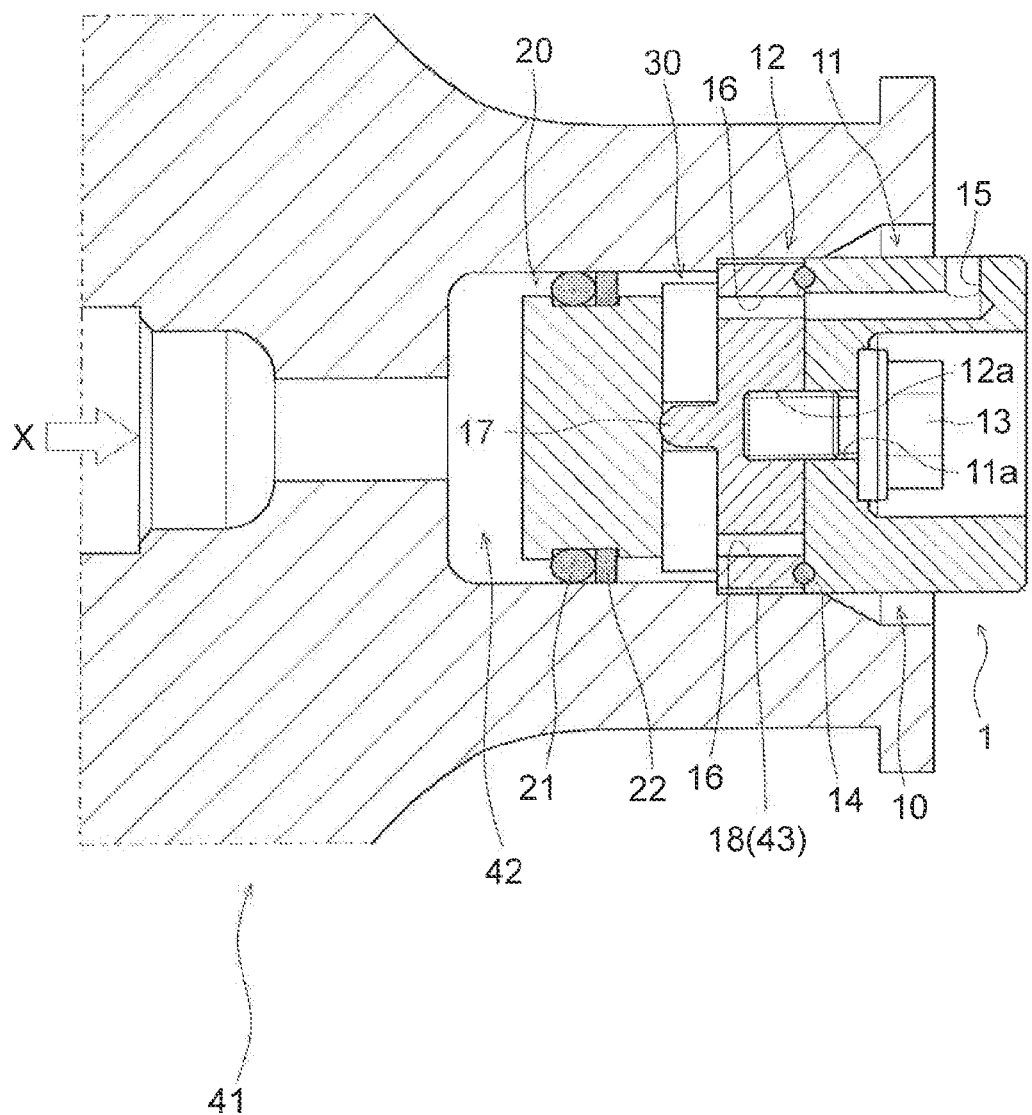
FIG. 4 is a sectional schematic view showing an arrangement status of the meltable type safety valve relative to the mouth ring.
Figure 5:
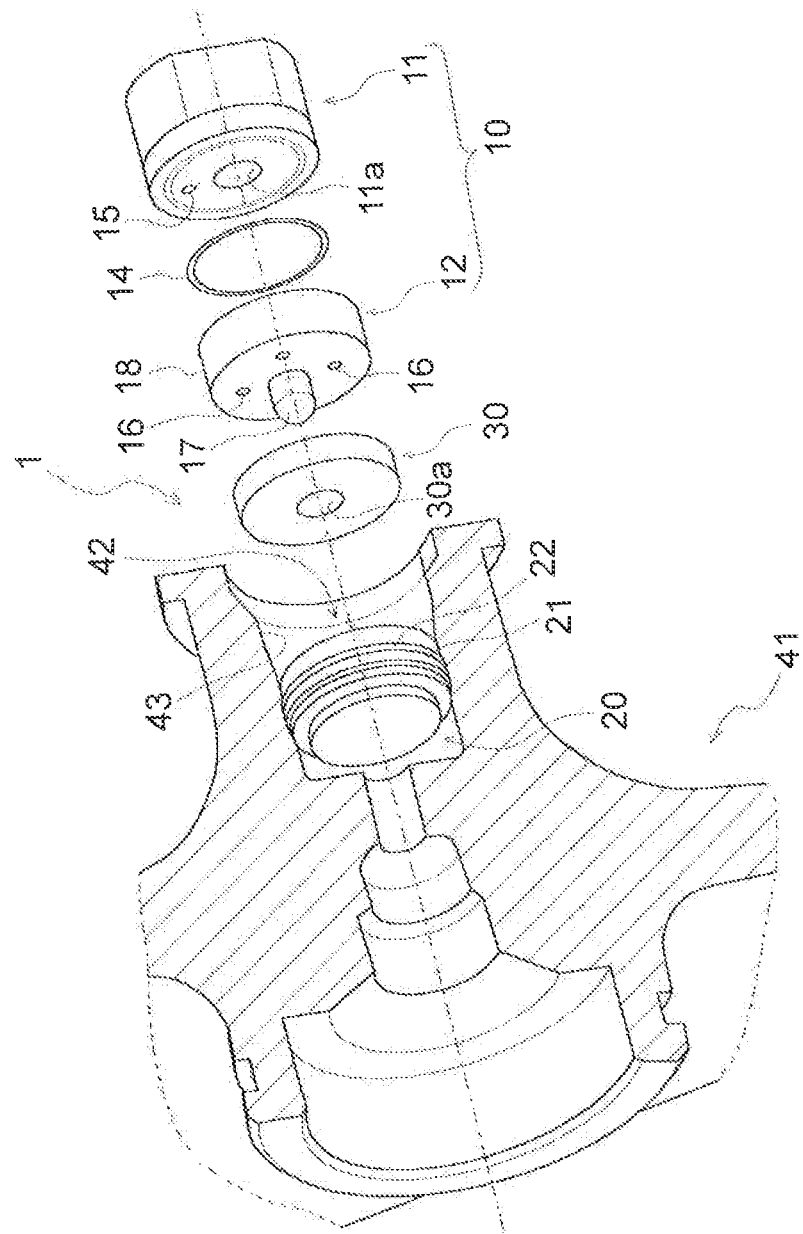
FIG. 5 is a perspective schematic view for illustrating a structure of the meltable type safety valve arranged at the mouth ring.

As shown in FIGS. 4 and 5, the meltable type safety valve 1 firstly inserts the valve element 20 in a state of mounting the O-shaped seal ring 21 therein into the opening portion 42 of the mouth ring 41, and then makes the external thread 18 of the valve seat 10 be in threaded connection with the internal thread 43 of the opening portion 42, thereby fixing the valve seat 10. It should be noted that when the valve seat 10 is fixed to the opening portion 42, the meltable body 30 is inserted beforehand into the opening portion 42 on a side of the valve element 20 of the valve seat 10, and the meltable body 30 is fixed by being clamped by the valve seat 10 and the valve element 20. It should be noted that in a state that the meltable type safety valve 1 is installed at the opening portion 42, the meltable body 30 is in contact with the valve seat 10 and the valve element 20, but the thickness is adjusted beforehand to make the stress acting on the valve element 20 mainly act on the valve seat 10. The thickness of the meltable body 30 is not limited, and it can be an arbitrary thickness, but it is preferred to make the thickness of the meltable body 30 equal to the height by which the protrusion 17 protrudes. In the case that the thickness of the meltable body 30 is larger than the height of the protrusion 17, even if the part going beyond the height of the protrusion 17 is damaged, the part below the height of the protrusion 17 can be prevented from being damaged as the protrusion 17 abuts against the valve element 20. In the case that the thickness of the meltable body 30 is equal to or smaller than the height of the protrusion 17, the damage of the meltable body 30 can be prevented by the abutment of the protrusion 17 against the valve element 20.

In this way, the meltable type safety valve 1 is formed into the following structure: in the opening portion 42, the valve element 20 is arranged on an upstream side of a direction X in which the gas is released, the valve seat 10 is arranged on a downstream side, and the meltable body 30 is arranged between the valve seat 10 and the valve element 20.

Moreover, the meltable type safety valve 1 is formed into a structure where the valve seat 10 bears the pressure acting on the valve element 20 due to the rise of the internal pressure of the pressure container 40, even in the case that the internal pressure of the pressure container 40 rises, the meltable body 30 will not be damaged due to pressurization, and even at a high temperature and a high pressure, wrong actions caused by the damage of the meltable body 30 are not likely to occur.

In addition, in the meltable type safety valve 1, since the excessive pressure does not act on the meltable body 30, the material of the meltable body 30 can be selected by paying more attention to the temperature characteristics rather than the strength. That is, compared with the related art, the meltable type safety valve 1 according to an embodiment of the invention can better deal with a condition of a high temperature and a high pressure and reduce the wrong actions, while using the existing material to construct the meltable body 30.

It should be noted that in the embodiment of the meltable type safety valve 1 as shown in FIGS. 1, 4 and 5, a structure where there is only one protrusion 17 having its front end portion hemispherical in the valve seat 10 (the release hole selection member 12) is illustrated, but the manner of the meltable type safety valve 1 of an embodiment of the invention is not limited thereto.

Figure 6A:
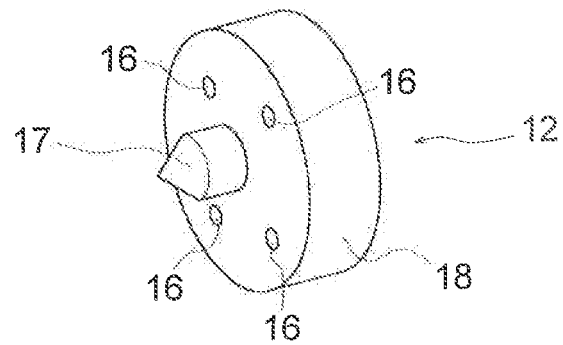
FIGS. 6A-6C are schematic views showing the other embodiments of a release hole selection member constructing the meltable type safety valve of an embodiment of the invention.
Figure 6B:
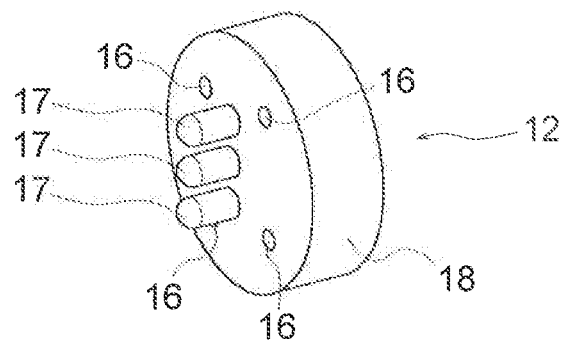
Figure 6C:
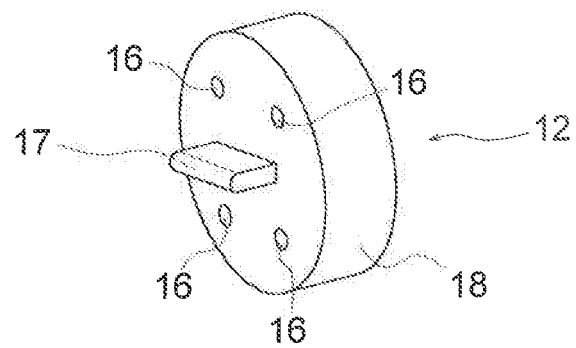

Here, FIGS. 6A-6C are used to illustrate the other embodiments of the release hole selection member 12 constructing the meltable type safety valve 1. FIG. 6A shows an embodiment in which the front end of the protrusion is tapered. As shown in FIG. 6A, the protrusion 17 formed on the release hole selection member 12 may also be configured in a manner that the front end thereof is tapered to have a conical shape.

In addition, FIG. 6B shows an embodiment in which a plurality of protrusions are formed. As shown in FIG. 6B, a plurality of protrusions 17 may also be provided on the release hole selection member 12. It should be noted that the release hole selection member 12 having three protrusions 17 is illustrated here, but the number of the protrusions 17 formed on the release hole selection member 12 is not limited thereto.

In addition, the protrusion 17 formed on the release hole selection member 12 not only can be substantially cylindrical as shown in FIGS. 6A and 6B, but also can be plate-shaped. For example, as shown in FIG. 6C, the protrusion 17 that is substantially plate-shaped can be adopted. It should be noted that the release hole selection member 12 having the protrusion 17 that is plate-shaped is illustrated here, but the shape of the protrusion 17 formed on the release hole selection member 12 is not limited thereto, and various shapes can be adopted.

The protrusion 17 formed on the release hole selection member 12 is preferably configured such that the abutment position where it abuts against the valve element 20 becomes a position that is deviated from the center (the axis) of the valve element 20. By means of such a structure, the valve element 20 is easily inclined, and the direction in which the valve element 20 is inclined can be controlled.

Figure 7A:
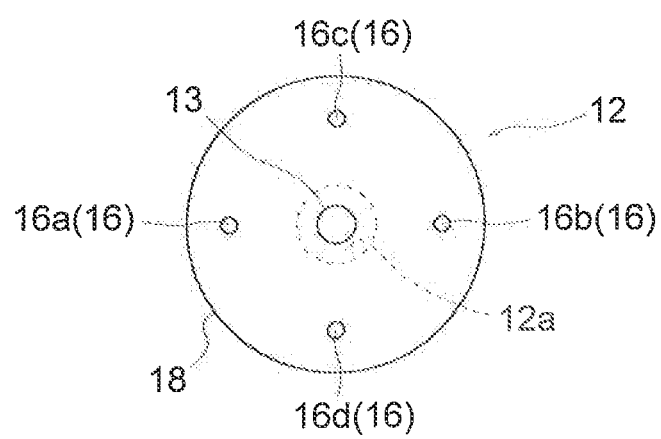
FIG. 7A is a schematic view for illustrating a selecting method of a gas release hole based on the release hole selection member, which shows a formation status of gas flowing-through holes in the release hole selection member.
Figure 7B:
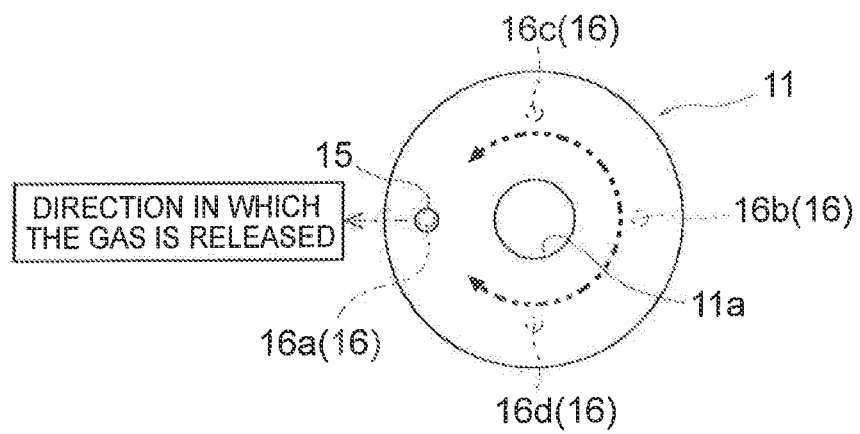
FIG. 7B is a schematic view for illustrating a selecting method of the gas release hole based on the release hole selection member, which shows a status of positioning the gas release hole in a valve seat body at the gas flowing-through hole.

Here, FIGS. 7A and 7B are used to illustrate a selecting status of the gas release hole 15 based on the release hole selection member 12. As shown in FIG. 7A, four gas flowing-through holes 16 are formed in the release hole selection member 12 as shown in this embodiment. It should be noted that in order to distinguish the respective gas flowing-through holes 16 here, the gas flowing-through holes 16 are expressed as gas flowing-through holes 16a, 16b, 16c, 16d in FIGS. 7A and 7B.

As shown in FIG. 7B, the valve seat body 11 is configured to be rotatable around the axis of the bolt hole 11a (the bolt 13), and the gas flowing-through hole 16 communicating with the gas release hole 15 can be selected by rotating the valve seat body 11. In the state as shown in FIG. 7B, the gas flowing-through hole 16a is selected, and the gas release hole 15 is made to communicate with the gas flowing-through hole 16a. Moreover, the other gas flowing-through holes 16b, 16c, 16d are closed by the valve seat body 11 to form a status that the gas does not flow through the other gas flowing-through holes.

In the meltable type safety valve 1, an angle by which the valve seat body 11 is rotated can be changed to select with which one of the gas flowing-through holes 16a, 16b, 16c, 16d the gas release hole 15 is made to communicate, and the direction in which the gas is released can be selected (changed) according to the selected gas flowing-through hole 16a, 16b, 16c, 16d.

It should be noted that in FIGS. 1, 4, 5, 7A and 7B, the circumstance where there is one gas release hole 15 formed in the valve seat body 11 and there are four gas flowing-through holes 16 formed in the release hole selection member 12 is illustrated, but the structure of the valve seat 10 constructing the meltable type safety valve 1 is not limited thereto. That is, in the valve seat 10 constructing the meltable type safety valve 1, the number of the gas release holes 15 formed in the valve seat body 11 and the number of the gas flowing-through holes 16 formed in the release hole selection member 12 can be properly selected. Moreover, the gas release holes 15 may be configured in a manner that two gas release holes 15 are made to converge inside the valve seat body 11 so that the directions in which the gases are released are concentrated to one direction, for example.

That is, the valve seat 10 constructing the meltable type safety valve 1 of an embodiment of the invention has the release hole selection member 12, which is formed with the gas flowing-through hole 16 for flowing-through of the gas at an end portion on a side facing the meltable body 30, and the direction in which the gas is released is changed by making the gas flowing-through hole 16 communicate with the selected gas release hole 15. By means of such a structure, a simple structure can be formed, and the direction in which the gas is released is easily adjusted.

It should be noted that in the meltable type safety valve 1 as shown in this embodiment, the release hole selection member 12 is used to construct the valve seat 10, but the release hole selection member 12 may also be omitted. In this case, the following structure may be formed: a plurality of gas release holes 15 are formed in the valve seat body 11, and if there is a gas release hole 15 not expected to release the gas, this gas release hole 15 is blocked from the outside by calking or the like, so that the direction in which the gas is released is selected.

Figure 8:
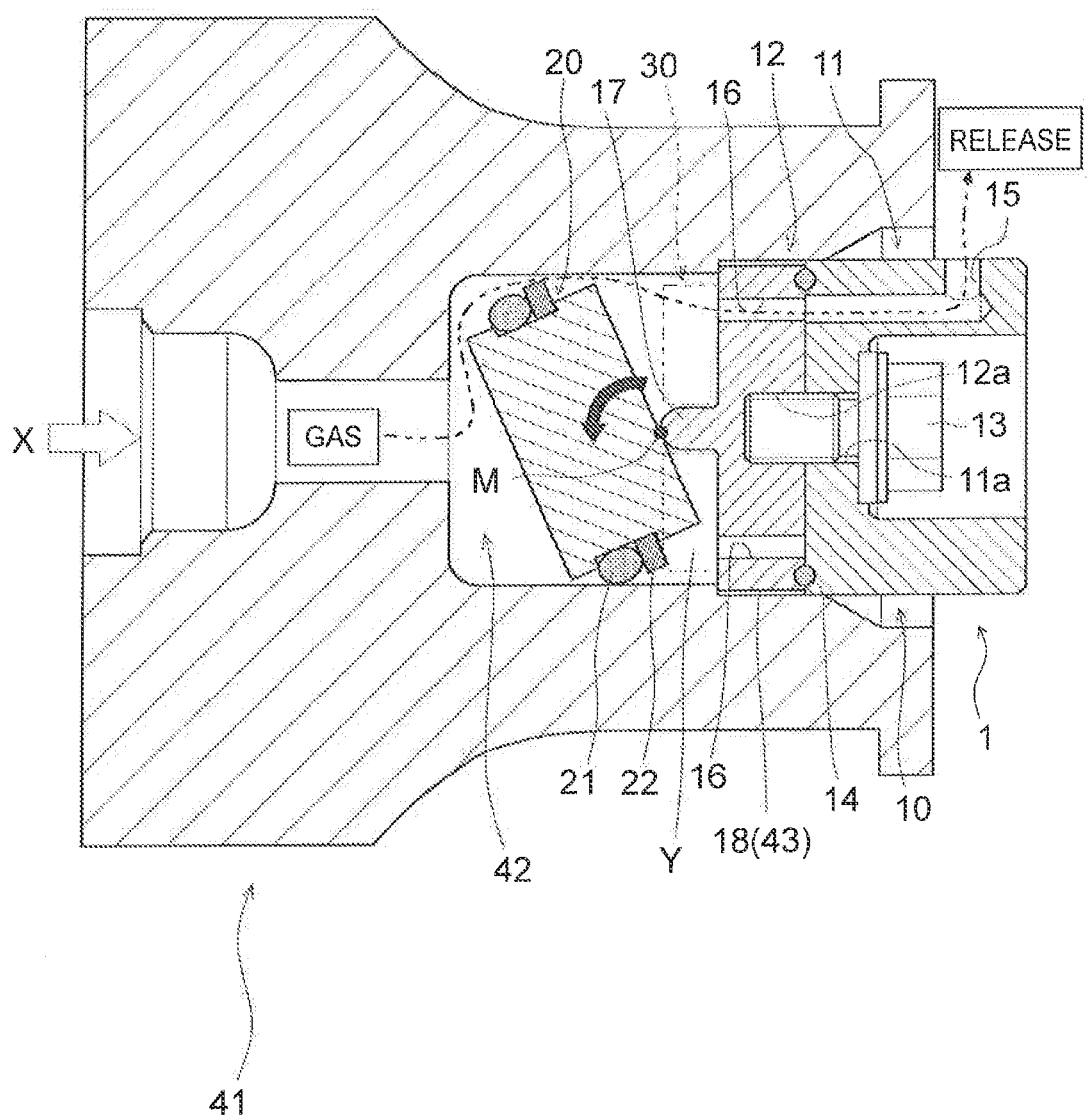
FIG. 8 is a sectional schematic view for illustrating an action status of the meltable type safety valve of an embodiment of the invention.

Next, FIG. 8 is used to illustrate the action status of the meltable type safety valve 1 of an embodiment of the invention. The meltable type safety valve 1 disposed at an abnormal high temperature is as shown in FIG. 8, where the meltable body 30 is melt, and a gap portion Y is formed within a range in which the meltable body 30 exists between the valve seat 10 and the valve element 20. When the gap portion Y is formed, the valve element 20 can be displaced such that it is inclined by taking an abutment position M of the protrusion 17 as a fulcrum. Since a pressure acts on the valve element 20, the valve element 20 is inclined, and the tightness (sealing property) produced by the O-shaped seal ring 21 is lost (the O-shaped seal ring 21 is separated from the opening portion 42) at this pressure. At this time, if the abutment position M is deviated from the center of the valve element 20, the valve element 20 is naturally inclined at the pressure of the gas.

Moreover, a gap is produced between the O-shaped seal ring 21 and the opening portion 42, and when the gas flowing-through hole 16 closed by the meltable body 30 is exposed, the release path of the gas formed by the gas flowing-through hole 16 and the gas release hole 15 is opened, and the gas is released from the inside to the outside of the pressure container 40. When the temperature of the pressure container 40 becomes an abnormal high temperature, the meltable type safety valve 1 reliably operates, and the excessive rise of the pressure inside the pressure container 40 is prevented by means of the meltable type safety valve 1.

That is, the meltable type safety valve 1 of an embodiment of the invention includes: a valve seat 10 that has a gas release hole 15 for releasing a gas and a protrusion 17 that protrudes towards the valve element 20; a valve element 20 that allows the inflow of the gas towards the gas release hole 15; and a meltable body 30 that is made of a material capable of being melt at an abnormal high temperature. At a temperature other than an abnormal high temperature, the meltable body 30 limits the displacement of the valve element 20 to thereby prevent the inflow of the gas towards the gas release hole 15; and at the abnormal high temperature, the meltable body 30 is melt, so the valve element 20 is displaced, and the gas is released from the gas release hole 15, By means of such a structure, the pressure acting on the meltable body 30 is inhibited to thereby prevent wrong actions of the meltable type safety valve 1 at a high temperature and a high pressure.

In addition, the meltable safety body 1 of an embodiment of the invention arranges the meltable body 30 at a position where the gas release hole 15 is blocked around the protrusion 17 between the valve seat 10 and the valve element 20. By means of such a structure, the meltable type safety valve 1 of a simple structure can be formed, and the pressure acting on the meltable body 30 can be inhibited.

In addition, the meltable type safety valve 1 of an embodiment of the invention forms the gap portion Y between the valve seat 10 and the valve element 20 when the meltable body 30 is melt, the valve element 20 is inclined towards the gap portion Y by taking the protrusion 17 as a fulcrum, so that the gas is released from the gas release hole 15. By means of such a structure, simplification of the structure is achieved, and the valve element 20 is inclined, thereby the gas release hole 15 can be easily and reliably opened.

What is claimed is:

1. A safety valve, comprising:
   a valve element;
   a valve seat that has a gas release hole from which a gas is released and a protrusion that protrudes towards the valve element, the protrusion being arranged at a position deviated from the gravity center of the valve element; and
   a meltable body that is made of a material capable of being melted at an abnormal high temperature, the meltable body being arranged between the valve element and the valve seat, wherein
   at a temperature other than the abnormal high temperature, the meltable body limits displacement of the valve element to thereby prevent inflow of the gas towards the gas release hole, and
   at the abnormal high temperature, the meltable body is melted, thereby the valve element is displaced and the gas is released from the gas release hole.

2. The safety valve according to claim 1, wherein
   the meltable body is arranged at a position where the gas release hole is blocked around the protrusion between the valve seat and the valve element.

3. A safety valve, comprising:
a valve element;
a valve seat that has a gas release hole from which a gas is released and a protrusion that protrudes towards the valve element; and
a meltable body that is made of a material capable of being melted at an abnormal high temperature, wherein
at a temperature other than the abnormal high temperature, the meltable body limits displacement of the valve element to thereby prevent inflow of the gas towards the gas release hole,
at the abnormal high temperature, the meltable body is melted, thereby the valve element is displaced and the gas is released from the gas release hole, wherein
a gap portion is formed between the valve seat and the valve element when the meltable body is melted, and
the valve element is inclined towards the gap portion by taking the protrusion as a fulcrum, so that the gas is released from the gas release hole.

4. The safety valve according to claim 1, wherein
the valve seat has a release hole selection member that forms a gas flowing-through hole through which the gas flows at an end portion on a side facing the meltable body, and a direction in which the gas is released is changed by making the gas flowing-through hole communicate with the selected gas release hole.

5. A safety valve, comprising:
a valve element;
a valve seat that has a gas release hole from which a gas is released and a protrusion that protrudes towards the valve element; and
a meltable body that is arranged between the valve element and the valve seat and contains a material capable of being melted at or above a predetermined temperature,
wherein the valve element and the meltable body are configured such that the meltable body limits displacement of the valve element to block the gas release hole before the meltable body is melted, and
the protrusion is configured such that the valve element is displaced by taking the protrusion as a fulcrum to open the gas release hole after the meltable body is melted.

6. The safety valve according to claim 5, wherein
the meltable body is arranged at a position where the gas release hole is blocked around the protrusion.

7. The safety valve according to claim 5, wherein
the valve seat has a release hole selection member that has a plurality of through-holes, and
at least one of the plurality of through-holes communicates with the gas release hole.

* * * * *